Figure 1:
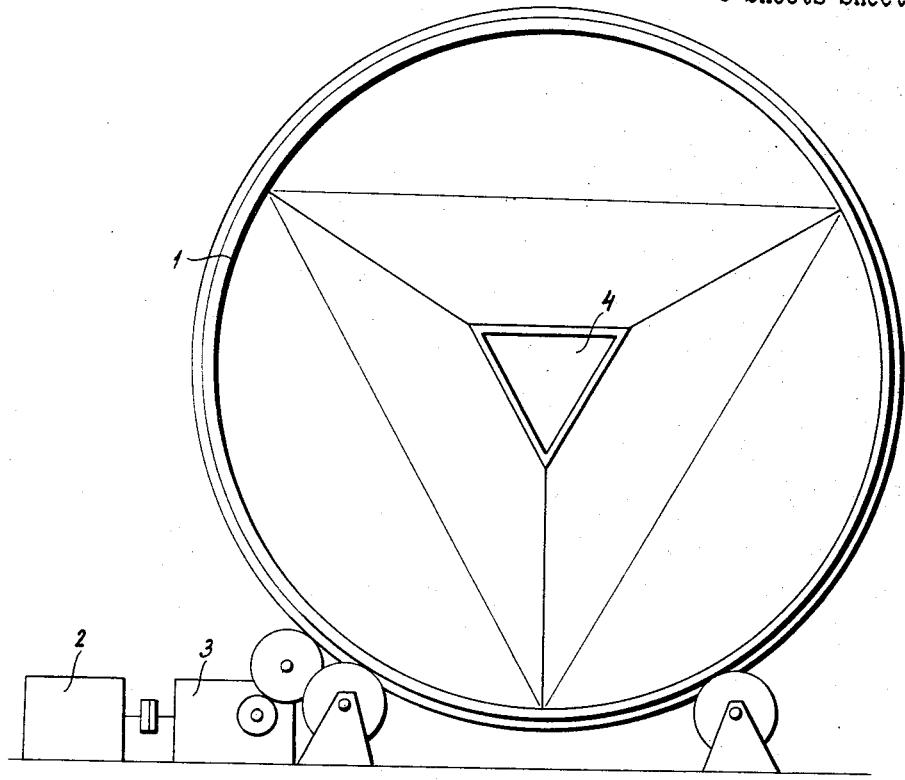

Sept. 26, 1967  L. TÖRÖK ETAL  3,343,813
MACHINE FOR MIXING AND DIVIDING TEST SPECIMENS OF MATERIAL
Filed Dec. 22, 1964  5 Sheets-Sheet 1

Sept. 26, 1967     L. TÖRÖK ETAL     3,343,813
MACHINE FOR MIXING AND DIVIDING TEST SPECIMENS OF MATERIAL
Filed Dec. 22, 1964     5 Sheets-Sheet 4

United States Patent Office 3,343,813
Patented Sept. 26, 1967

3,343,813
MACHINE FOR MIXING AND DIVIDING TEST SPECIMENS OF MATERIAL
László Török, Tivadar Markotai, and István Bogár, Pecs, Hungary, assignors to Nikex Nehezipari Kulkereskedelmi Vallalat, Budapest V., Hungary
Filed Dec. 22, 1964, Ser. No. 420,366
6 Claims. (Cl. 259—3)

The present invention relates to a machine for mixing and subdividing specimens of material for testing.

In coal and ore mining, agriculture and the chemical industry, the amount of test material (initial specimen) which is necessary to be able to determine accurately the average quality of a large volume of the same material is usually so large that further mixing and subdivision is required. The initial specimen taken from the basic volume of material must therefore be subdivided until a quantity is obtained which is suitable for the quality testing to be carried out. To obtain from the whole volume of this initial specimen, a test specimen which really corresponds to the average quality of the material to be tested, the test specimens must be thoroughly mixed before each division.

For example, to establish the average quality of a volume of 600 t. of iron ore, the standard specification lays down that 1% of ore must be used. However, such a quantity cannot be analysed chemically so it must be subdivided several times. However, in order that the test sample shall truely represent the initial specimen, the intermediate specimens obtained in the separate stages must be thoroughly mixed before each further subdivision takes place. In this way the initial sample weighing 600 kg. must be divided and mixed eleven times. This is done in the following stages:

600/2=300; 300/2=150; 150/2=75; 75/2=37.5; 37.5/2=18.75; 18.75/2=9.375; 9.375/2=4.6875; 4.6875/2=2.34375; 2.34375/2=1.17; 1.17/2=0.585; 0.585/2=0.295=0.3 kg.

The last stage gives the weight of the final test specimen.

The mixing and dividing is still generally carried out by hand at present which involves a great deal of hard work. In modern mechanical processes the material is fed into a vertical dividing channel where it is divided by means of the gravitational force, and the mixing takes place subsequently in drums—similar to concrete mixers. If the material has to be mixed several times in the course of the process (e.g. after each division), it must be raised up to the inlet orifice of the relatively high separating device. The disadvantage of this type of device is chiefly its great height which, besides installation difficulties, also involves a large wastage in material and energy.

The aim of the present invention is therefore to produce a mixing and dividing machine of a more simple design than previous machines, which takes up less space, is less expensive both to construct and to run and which also has the advantage that the time required to produce the final test specimen is much shorter.

The machine in the invention consists of two or more boxes which are fitted with axial symmetry inside a rotatable drum and are connected together by a centrally mounted dividing channel. The dividing channel is made up of a number of compartments in such a way that this number is an integral multiple of the number of boxes, and each compartment connects up two or three different boxes.

Figure 4:
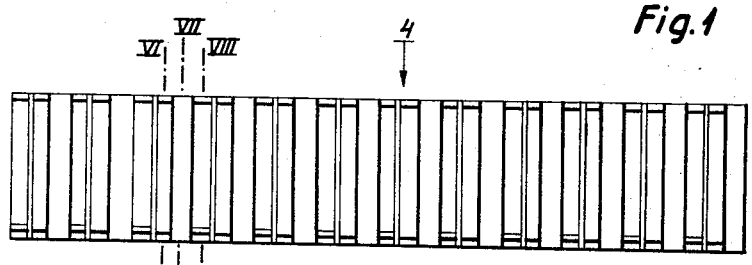
Figure 2:
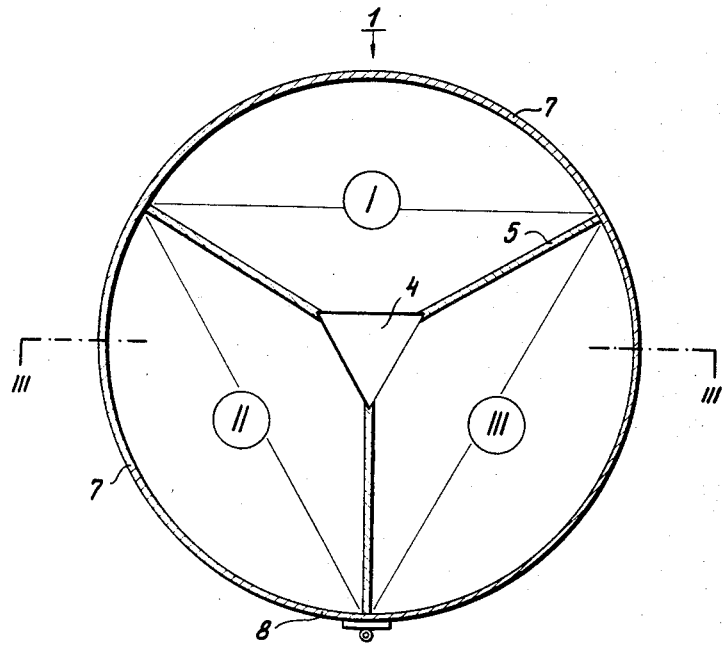
Figure 3:
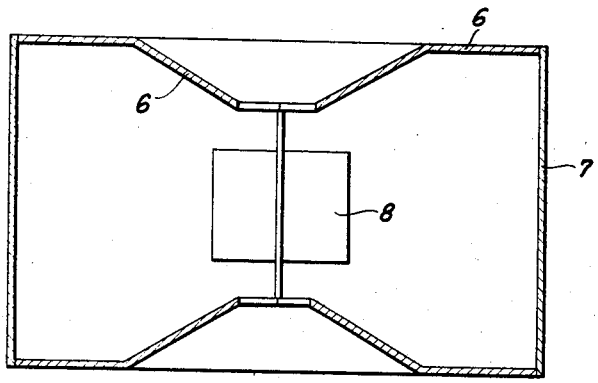
Figure 9:
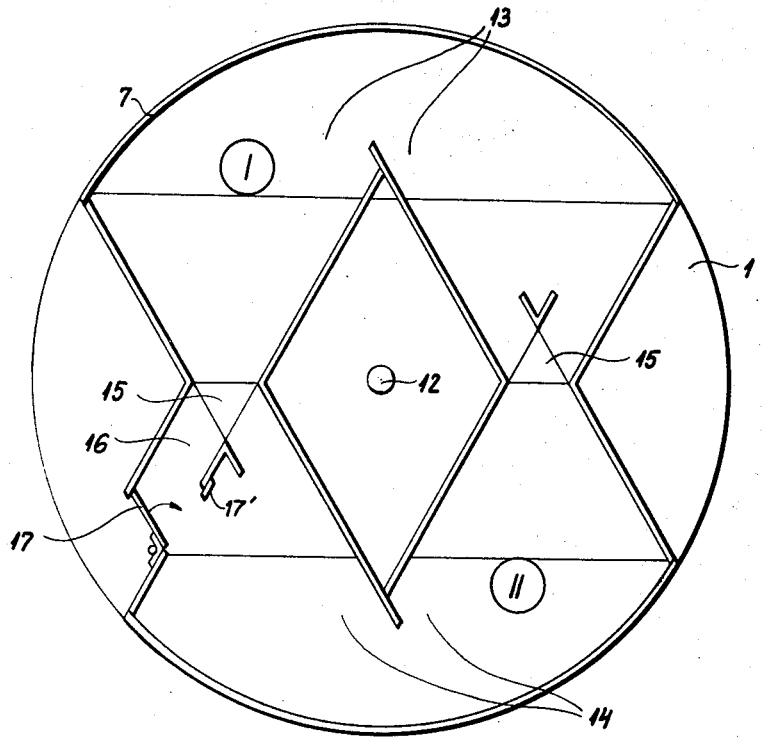
Figure 11:
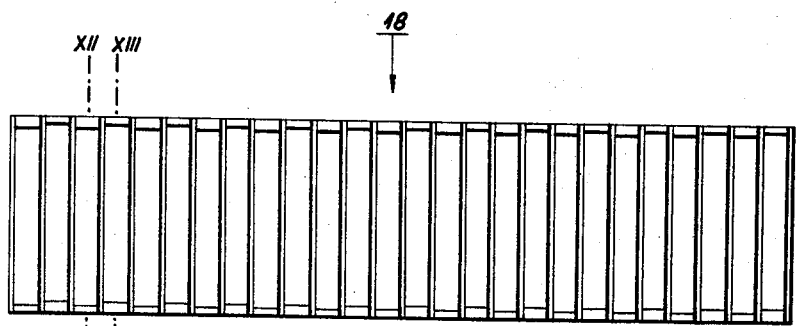
Figure 10:
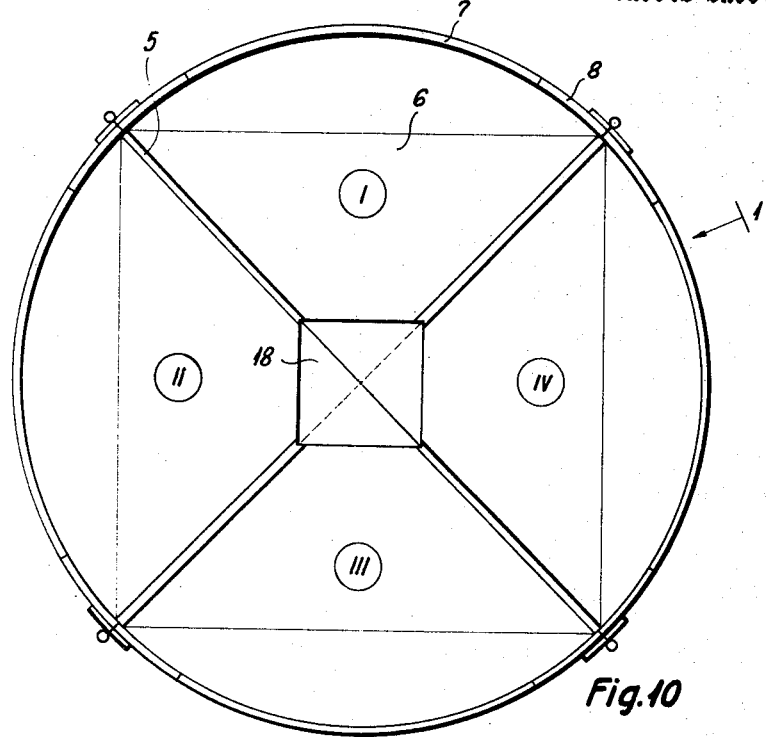
Figure 12:
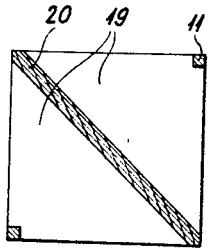
Figure 13:
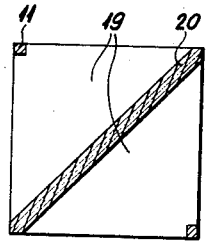
Figure 17:
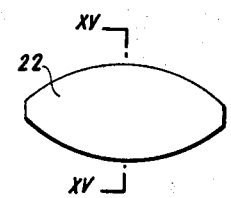
Figure 18:
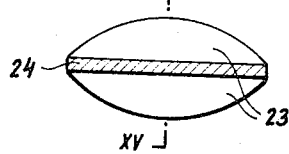
Figure 19:
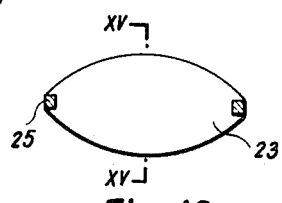
Figure 14:
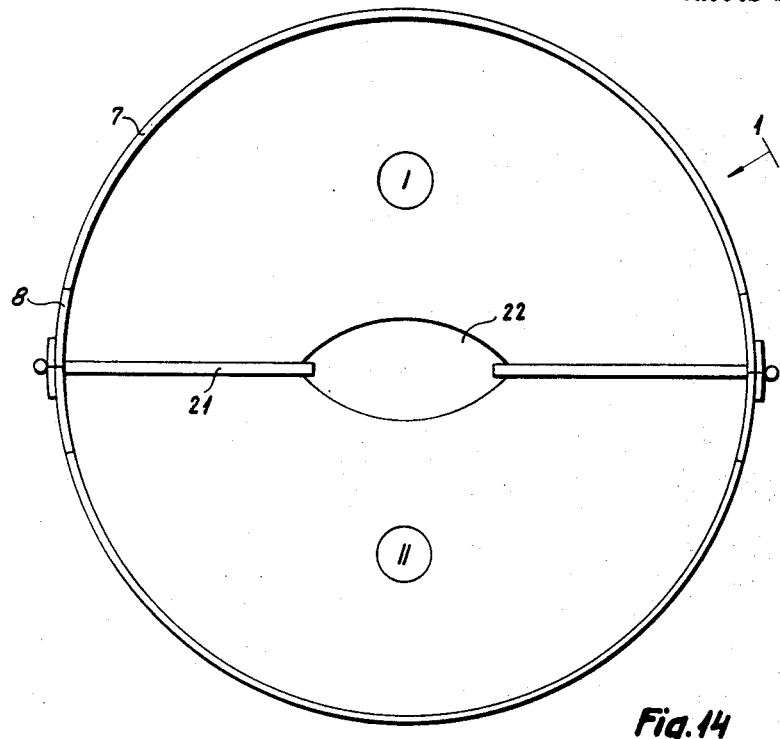
Figure 15:
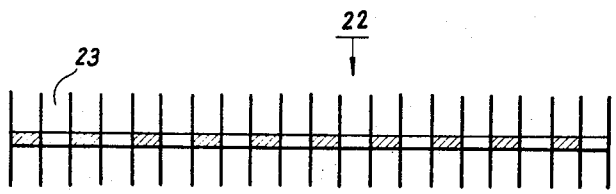
Figure 16:
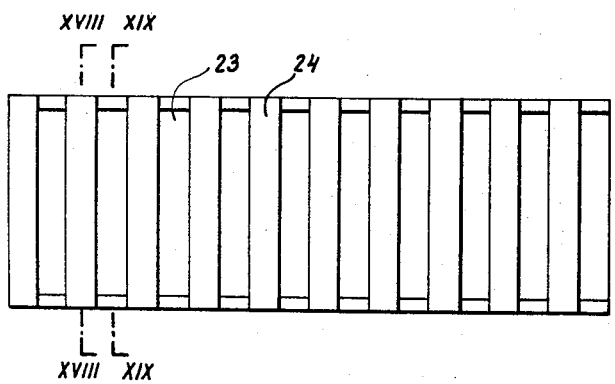

Some embodiments of the machine in accordance with the invention are depicted in the accompanying drawings, which show:

FIGURE 1 a view of the machine in the direction of the axis of the drum,
FIGURE 2 a cross-section of a drum with three boxes,
FIGURE 3 a section along line III—III in FIG. 2, the dividing channel being omitted from FIG. 3 so as to show more clearly the structure therebeneath,
FIGURE 4 a side elevation of a triangular dividing channel as seen in a plane which includes the lines IV—IV of FIGS. 6–8,
FIGURE 5 an end axial view corresponding to FIG. 4,
FIGURES 6 to 8 sections along lines VI—VI, VII—VII, VIII—VIII in FIG. 4,
FIGURE 9 a cross-section through a drum fitted with two boxes,
FIGURE 10 a cross-section through a drum fitted with four boxes,
FIGURE 11 a side view of a square dividing channel,
FIGURE 12 a section along line XII—XII in FIG. 11,
FIGURE 13 a section along line XIII—XIII in FIG. 11,
FIGURE 14 a cross-section through a drum with two boxes,
FIGURE 15 a longitudinal section through the elliptical dividing channel of the two-box drum along line XV—XV in FIGS. 17–19,
FIGURE 16 a top elevation of FIG. 15,
FIGURE 17 an end view of the dividing channel in FIG. 15,
FIGURE 18 a section along line XVIII—XVIII in FIG. 16,
FIGURE 19 a section along line XIX—XIX in FIG. 16.

FIGURE 1 shows an example of a mixing and dividing machine (in the example a halving machine) the drum 1 of which is mounted on rollers. An electro-motor 2 and reducer 3 are used to drive these rollers with a velocity equal to about 1 rotation of the drum per minute. As can be seen from FIGS. 2–3, the inside of the drum is divided—symmetrically to the axis of the drum—into three boxes I, II and III, and the dividing channel or distributing means 4 is fitted between them on the central line of the drum. The cross-section of the channel is in the form of an equilateral triangle. The longitudinal walls of the boxes 5 terminate at the apices of the dividing channel 4. Besides having walls 5 the boxes are also bounded by the end walls 6 and the curved walls 7 forming the shell of the drum. Two of the boxes, in FIG. 2 chambers II and III, have hinged doors 8 through which material is fed in or removed.

Figures 5, 6, 7, 8:
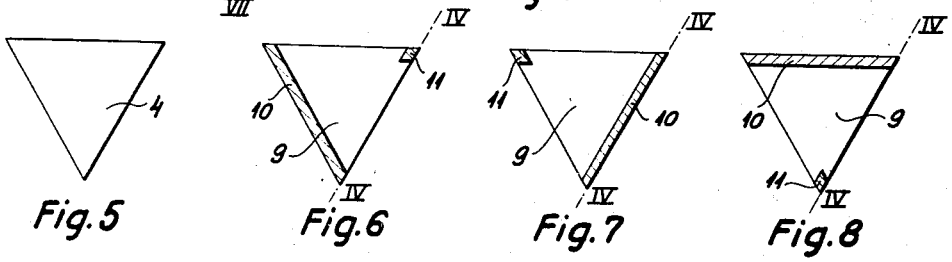

FIGURE 4 shows a dividing channel 4 which consists of a group of compartments, the number of these corresponding to an integral multiple of the number of boxes (three), and the shape being a prism of triangular section. Each of the groups of compartments consists of three compartments 9 which only differ in that the individual side walls 10 are on different sides of the triangle as shown in FIGS. 6–8. The separation between the compartments is maintained by spacers 11.

Using this machine the material to be tested is mixed and divided in the following manner:

The material is fed into one of the boxes II or III fitted with a door 8, for example box II (FIG. 2). The drum is then rotated in a clockwise direction. As a result of this the material flows through the dividing channel 4 so that half enters each of the other two boxes I and III, and then subsequent rotation causes material to leave box III so that again half enters each of the other boxes I and II. After 10–15 rotations the material has been thoroughly mixed by this constant halving. When this has been carried out, the material is collected together in box II. To do this, the drum is held so that box III is in the upper position and is then rotated in the reverse direction so that box I is uppermost. This motion is such that box II is always at the bottom. The process is continued until substantially all the material is in box II.

When the material has substantially all been collected in box II it is divided by halving the material until the desired quantity is obtained. For example, assume that 1/16 of the volume of mixed material is to be taken. This is achieved as follows:

(1) Box II is brought into the upper position by rotating it in a clockwise direction, and it remains in this position until all the material has passed into boxes I and III so that half is in each of these boxes.

(2) Box I is brought into the upper position by rotating it in an anti-clockwise direction, and it remains in this position until the material passes into boxes II and III. 1/4 of the material is then in box II and 3/4 in box III.

(3) Box II is brought into the upper position by rotating it in a clockwise direction, and it remains in this position until the material in it has passed into boxes I and III. 1/8 of the original volume of material is then in box I and 7/8 in box III.

(4) Box I is brought into the upper position by rotating it in an anti-clockwise direction, and it remains in this position until the material has passed into boxes II and III. 1/16 of the original volume of material is then in box II and 15/16 in box III. The door 8 in box II is then opened and the material which forms the final test specimen is removed, whilst the remaining material is simultaneously removed through door 8 in box III.

FIGURE 9 shows a variant of the machine whereby the drum 1 is mounted on a shaft 12. Instead of having three boxes, this drum has two sets of two boxes, 13 and 14 lying opposite one another. These are connected by dividing channels 15 arranged on either side of the shaft of the drum and having a cross-section in the form of an equilateral triangle. Next to one of these channels is the closed space 16 with the input and extraction door 17. The mode of operation of this machine is similar to that of the three-box variant. Thus, assuming that a charge has been introduced through the door 17 which is then returned to its position shown in FIG. 9, and that the drum is rotated in a clockwise direction, as viewed in FIG. 9, then it is clear that the right distributing means 15 shown in FIG. 9 will initially direct the material along a pair of diverging paths to different areas of the interior portion 13 of the drum so that the material is in this way halved, and of course the material becomes combined again during the continued rotation of the drum whereupon the distributing means 15 shown at the left of FIG. 9 will reach the position shown in FIG. 9 and will again direct the material toward different portions of the interior of the drum along diverging paths, thus again halving the material which again becomes combined together during the continued rotation of the drum. Thus, with this embodiment the material is continually halved and recombined so that it will become thoroughly mixed. When it is desired to remove a sample the door 17 is turned into engagement with the strip 17' indicated in FIG. 9, so that in this way the space 16 is closed off from the remainder of the interior of the drum. Now during each rotation of the drum one half of the material therein will be displaced out of the drum through the door 17 while this material moves through the space 16 which extends along one of the diverging paths along which the material is directed by the left distributing means 15 of FIG. 9, and thus after each complete revolution of the drum of FIG. 9 there will be displaced through the open door 17 one half of whatever amount of material remains in the drum. In this way at each successive revolution the amount of material remaining within the drum is reduced by one half, and when a small enough amount of material to constitute a suitable sample is received from the access means formed by the door 17, the operations can be terminated. Thus, it will be noted that with the embodiment of FIG. 9 before any sample is extracted from the drum the material is constantly halved and recombined, and this halving and recombining of the material even continues during displacement of one half the amount of material in the drum from the latter at each revolution in order to reduce the amount of material to a size suitable for a testing sample.

When the three box drum in question is used, every third opening in the dividing channel is closed to flow which causes the material to buckle slightly. The accuracy of the mixing and dividing is generally not affected by this. However, if relatively damp material is being treated it is possible that it will not flow through. For this reason it is necessary to omit the closed openings. This is done in the four box drum with a dividing channel in the form of a square prism as shown in FIGS. 10–13. The compartments in this dividing channel are separated by the walls 20 fitted alternately along opposing diagonals. As a result, from the point of view of flow—from whichever side—each compartment is open. The dividing channel therefore halves material flowing out of any of the four boxes.

As can be seen in FIG. 10, each of the four axially symmetric boxes I–IV has a hinged door 8. FIGURE 14 shows another variant of the mixing and dividing drum in which the space inside the drum is divided into two equal boxes I and II by means of a plane plate 21. At the centre of the drum is a dividing channel with an elliptical cross-section (FIGS. 15–19), the compartments 23 of this being formed by elliptical plates. As can be seen from FIGS. 16 and 18, every second compartment is divided into two equal parts by a plate 24. The separation between compartments not divided in this way is maintained by spacers 25. With this variant part of the material passes from one box into the other through the dividing channel whilst the other part slides from one side of the same box to the other. This process is repeated with each revolution during mixing, and during the dividing process the drum is merely rocked to left and right about its axis.

Thus, it will be seen that with the structure of the present invention the rotary drum is provided in its interior with a distributing means which extends parallel to the axis of the drum for receiving material in the drum from whichever part of the drum happens at any given instant to be uppermost and for directing the received material respectively along at least one pair of diverging paths so that the material is distributed by the distributing means to different portions of the drum interior during rotary movement of the drum, and an access means, formed by any of the doors referred to above, communicates with the interior of the drum for giving access to at least one of the portions to which the material is directed by the distributing means so that through the access means it is possible to receive from the drum a sample which is only a fraction of the material initially introduced into the drum.

What we claim is:

1. A machine for mixing and dividing test specimens of material, comprising a rotatable drum fitted with at least two boxes arranged symmetrically with respect to the axis of rotation of the drum and, said boxes rotating together with the drum about said axis thereof so that at any given instant one box is at a higher elevation than the other, distributing means for receiving material from whichever box is at a higher elevation at any given instant and for distributing the received material respectively along a pair of diverging paths directed toward different portions of the drum situated in regions thereof lower than said distributing means, said distributing means extending parallel to the axis of rotation of the drum and having compartments through which said boxes are connected to one another, the number of said compartments being equal to an integral multiple of the number of boxes, and access means carried by said drum and providing access to at least one interior portion thereof to which material is directed along at least one of said diverging paths by said distributing means, so that a test specimen which is but a small fraction of the amount of material initially treated in the drum can be removed therefrom through said access means.

2. A machine as claimed in claim 1 with three symmetrically arranged boxes, wherein said boxes have longitudinal walls which meet at the respective apices of a dividing channel with a cross-section in the form of an equilateral triangle, said dividing channel forming at least part of said distributing means and being made up of compartments in the form of triangular prisms one side of which is closed by a wall, the side walls of successive compartments being on different sides of the compartments.

3. A machine as claimed in claim 1 having two sets of two boxes mounted opposite to one another on each side of the axis of rotation of the drum, each set of opposite boxes being connected by a dividing channel forming part of said distributing means and being in the form of a triangular prism, one of the boxes also being fitted with a special space which can be closed and which is provided with a door for charging and removing material, and said door forming at least part of said access means.

4. A machine as claimed in claim 1 with four boxes arranged with axial symmetry, said boxes having longitudinal walls which meet respectively at the corners of a dividing channel forming part of said distributing means and being in the form of a square prism, this channel being made up of compartments in the form of square prisms, these compartments being divided in halves by diagonal plates in such a way that the halves of alternate compartments are in opposite positions.

5. A machine as claimed in claim 1 with two boxes arranged symmetrically with respect to said axis and separated by a longitudinal wall, a dividing channel forming part of said distributing means and being mounted along the longitudinal wall separating said boxes, said channel consisting of compartments which, viewed from the end, have an elliptical cross-section, and every second compartment being divided into two equal parts by a plate.

6. In a machine for mixing and dividing a flowable material from which relatively small test specimen is to be taken, a rotary drum having a substantially horizontal axis of rotation and having a hollow interior part of which at any given instant is located at an elevation higher than said axis, and distributing means situated in the interior of the drum, extending longitudinally thereof substantially parallel to said axis for receiving material from that part of the interior of the drum which at any given instant is at an elevation higher than said axis and for distributing the received material respectively along a pair of diverging paths to lower interior regions of the drum which are situated at an elevation lower than said axis, so that the material is divided by said distributing means during rotation of the drum, and access means carried by said drum and providing access to the interior thereof, said access means providing communication with at least one of the interior regions of the drum to which material is directed by said distributing means, so that through said access means it is possible to receive from the drum a test specimen which is but a small fraction of the initial amount of material introduced into the drum.

References Cited
UNITED STATES PATENTS 1,147,903    7/1915    Smith _____ 259—30 X
2,919,116    12/1959    Fischer _____ 259—81 X WILLIAM I. PRICE, *Primary Examiner.*

WALTER A. SCHEEL, *Examiner.*

J. M. BELL, *Assistant Examiner.*